US006824310B1

(12) United States Patent
Chung

(10) Patent No.: US 6,824,310 B1
(45) Date of Patent: Nov. 30, 2004

(54) ADAPTER FOR OPTICAL FIBER CABLE

(75) Inventor: Li-Seng Chung, Hsintien (TW)

(73) Assignee: 3A Fiber Optic Communications, Inc., Hsintien (TW)

( * ) Notice: Subject to any disclaimer, the term of this patent is extended or adjusted under 35 U.S.C. 154(b) by 0 days.

(21) Appl. No.: 10/657,913

(22) Filed: Sep. 9, 2003

(51) Int. Cl.[7] .................................................. G02B 6/36
(52) U.S. Cl. ........................................................ 385/76
(58) Field of Search ............................... 385/76–78, 53, 385/66, 84, 88, 89, 93

(56) References Cited

U.S. PATENT DOCUMENTS 6,019,520 A * 2/2000 Lin et al. ...................... 385/76

2003/0091298 A1 * 5/2003 Chang et al. .................. 385/86

* cited by examiner

Primary Examiner—Phuong Dinh
(74) Attorney, Agent, or Firm—Alan D. Kamrath; Nikolai & Mersereau, P.A.

(57) ABSTRACT

An adapter connector includes an insertion terminal, a connecting member, a plurality of connecting tubes, and a plurality of optical fiber cables. Thus, by connection of the quick connector and the insertion posts of the connecting member, each of the optical fiber cables is connected to the testing instrument stably and efficiently, thereby facilitating the testing instrument performing the testing procedures. In addition, each of the optical fiber cables can be removed from the respective connecting tube easily and rapidly, thereby shortening the testing time, and thereby enhancing the testing efficiency.

9 Claims, 16 Drawing Sheets

US 6,824,310 B1

ADAPTER FOR OPTICAL FIBER CABLE

BACKGROUND OF THE INVENTION

1. Field of the Invention

The present invention relates to an adapter, and more particularly to a an adapter for an optical fiber cable, wherein each of the optical fiber cables with connectors can be removed from the respective connecting tube easily and rapidly for replacement, thereby shortening the testing time, and thereby enhancing the testing efficiency.

2. Description of the Related Art

A conventional adapter 7 for an optical fiber cable in accordance with the prior art shown in FIG. 13 comprises a first connecting member 71 having a plane 711 and a positioning sleeve 712 inserted into the plane 711, a second connecting member 72 having a plane 72 rested on the plane 711 of the first connecting member 71 and a positioning sleeve 722 inserted into the plane 721, and a connecting tube 73 having a first end 731 inserted into the positioning sleeve 712 of the first connecting member 71 and a second end 732 inserted into the positioning sleeve 722 of the second connecting member 72.

However, the positioning sleeve 712 is inserted into the plane 711 of the first connecting member 71 to combine with the first connecting member 71, and the positioning sleeve 722 is inserted into the plane 721 of the second connecting member 72 to combine with the second connecting member 72, so that the two positioning sleeves 712 and 722 are not aligned with each other easily, thereby increasing difficulty in the working process and decreasing the precision of the products. In addition, the optical fiber cable cannot be mounted on and removed from the conventional connector 7 easily and rapidly for replacement, thereby increasing the testing time and decreasing the testing efficiency.

Another conventional adapter for an optical fiber cable in accordance with the prior art shown in FIG. 14 comprises two connecting members 71A each having a plane 711A and a positioning sleeve 712A inserted into the plane 711A, and a connecting tube 74A having two ends each inserted into the positioning sleeve 712A of the respective connecting member 71A.

However, the positioning sleeve 712A is inserted into the plane 711A of the connecting member 71A to combine with the connecting member 71A, so that the two positioning sleeves 712A are not aligned with each other easily, thereby increasing difficulty in the working process and decreasing the precision of the products. In addition, the optical fiber cable cannot be mounted on and removed from the conventional connector easily and rapidly for replacement, thereby increasing the testing time and decreasing the testing efficiency.

Another conventional adapter 8 for an optical fiber cable in accordance with the prior art shown in FIGS. 15 and 16 comprises a connecting seat 81 formed with an insertion hole 812 and an inner thread 811, a connecting sleeve 82 mounted on the connecting seat 81 and formed with an insertion hole 822 and having an outer thread 821 screwed into the inner thread 811 of the connecting seat 81, and a connecting tube 83 having two ends inserted into the insertion hole 812 of the connecting seat 81 and the insertion hole 822 of the connecting sleeve 82 respectively.

However, the insertion hole 812 of the connecting seat 81 and the insertion hole 822 of the connecting sleeve 82 are not aligned with each other easily, thereby increasing difficulty in the working process and decreasing the precision of the products. In addition, the optical fiber cable cannot be mounted on and removed from the conventional connector 8 easily and rapidly for replacement, thereby increasing the testing time and decreasing the testing efficiency.

Another conventional adapter 9 for an optical fiber cable in accordance with the prior art shown in FIG. 17 comprises a connecting seat 91 having a center formed with a connecting hole 913 having a first end formed with a first inserted hole 911 having an end face formed with a first inner thread 9111 and a second end formed with a second insertion hole 912 having an end face formed with a second inner thread 9121, a first connecting sleeve 93 having an outer wall formed with an outer thread 933 screwed into the first inner thread 9111 of the connecting seat 91 and an inner wall formed a first receiving hole 931, a first connecting tube 92 having two ends inserted into the first insertion hole 911 of the connecting seat 91 and the first receiving hole 931 of the first connecting sleeve 93 respectively, a second connecting sleeve 95 having an outer wall formed with an outer thread 951 screwed into the second inner thread 9121 of the connecting seat 91 and an inner wall formed with a second receiving hole 952, and a second connecting tube 94 having two ends inserted into the second insertion hole 912 of the connecting tube 91 and the second receiving hole 952 of the second connecting sleeve 95 respectively. In addition, the first receiving hole 931 of the first connecting sleeve 93 has an end formed with a first catch edge 932 rested on the first connecting tube 92, and the second connecting tube 94 has an outer wall formed with a second catch edge 941 rested on the second connecting sleeve 95.

However, the first insertion hole 911 and the second insertion hole 912 of the connecting seat 91 are not aligned with each other easily, thereby increasing difficulty in the working process and decreasing the precision of the products. In addition, the optical fiber cable cannot be mounted on and removed from the conventional connector 9 easily and rapidly for replacement, thereby increasing the testing time and decreasing the testing efficiency.

SUMMARY OF THE INVENTION

The primary objective of the present invention is to provide an adapter for an optical fiber cable.

Another objective of the present invention is to provide an adapter, wherein by connection of the quick connector and the insertion posts of the connecting member, each of the optical fiber cables is connected to the testing instrument stably and efficiently, thereby facilitating the testing instrument performing the relevant testing procedures.

A further objective of the present invention is to provide an adapter, wherein each of the optical fiber cables can be mounted an and removed from the second insertion hole of a respective one of the connecting tubes easily and rapidly for facilitating replacement, thereby shortening the testing time, and thereby enhancing the testing efficiency.

In accordance with the present invention, there is provided an adapter, comprising:

an insertion terminal having a first side formed with an insertion end and a second side formed with a receiving space connecting to the insertion end;

a connecting member mounted on the insertion terminal and including a quick connector inserted into the receiving space of the insertion terminal, and a plurality of insertion posts each having a first end connected to a distal end of the quick connector;

a plurality of connecting tubes each having a first end mounted on a second end of a respective one of the insertion posts of the connecting member; and a plurality of optical fiber cables each having an end mounted on a second end of a respective one of the connecting tubes and each contacting with the second end of a respective one of the insertion posts of the connecting member.

Further benefits and advantages of the present invention will become apparent after a careful reading of the detailed description with appropriate reference to the accompanying drawings.

DETAILED DESCRIPTION OF THE INVENTION

Figure 1:
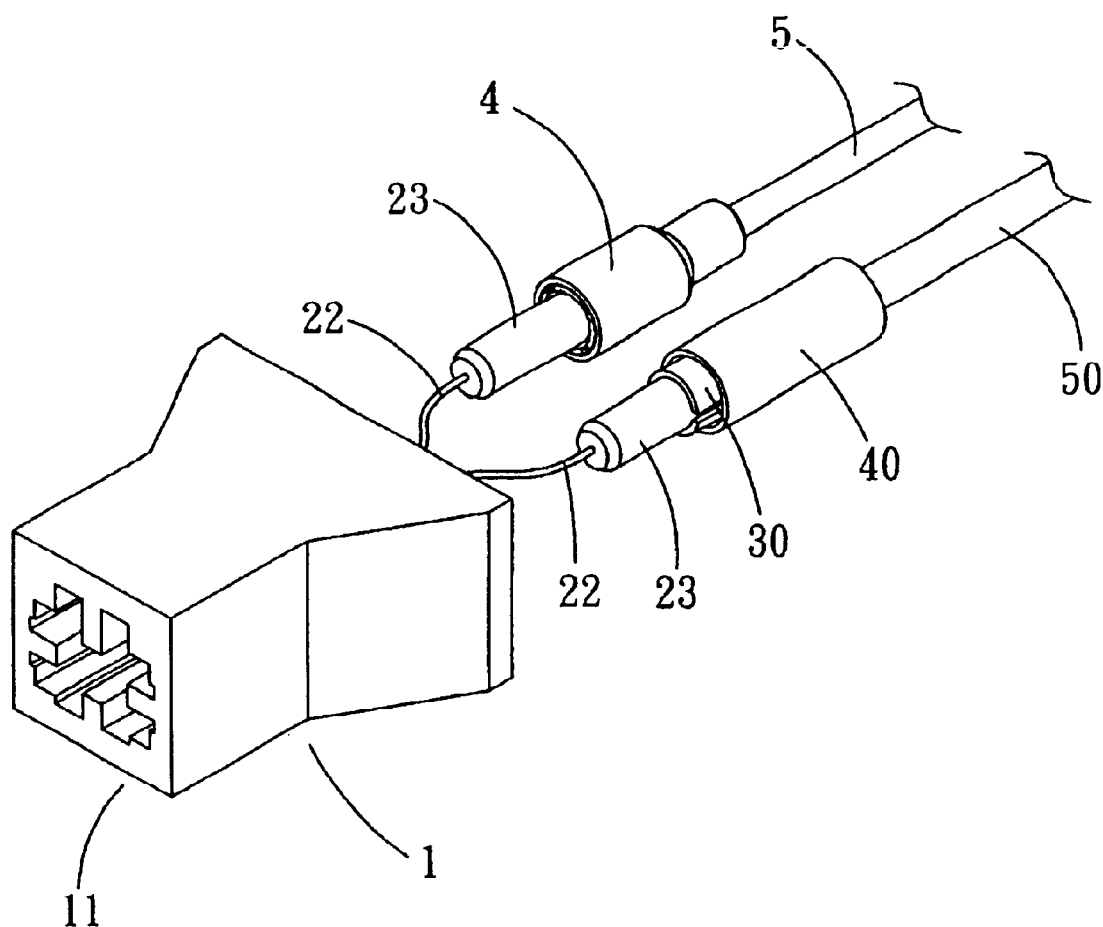
FIG. 1 is a partially cut-away perspective view of an adapter in accordance with the preferred embodiment of the present invention.
Figure 2:
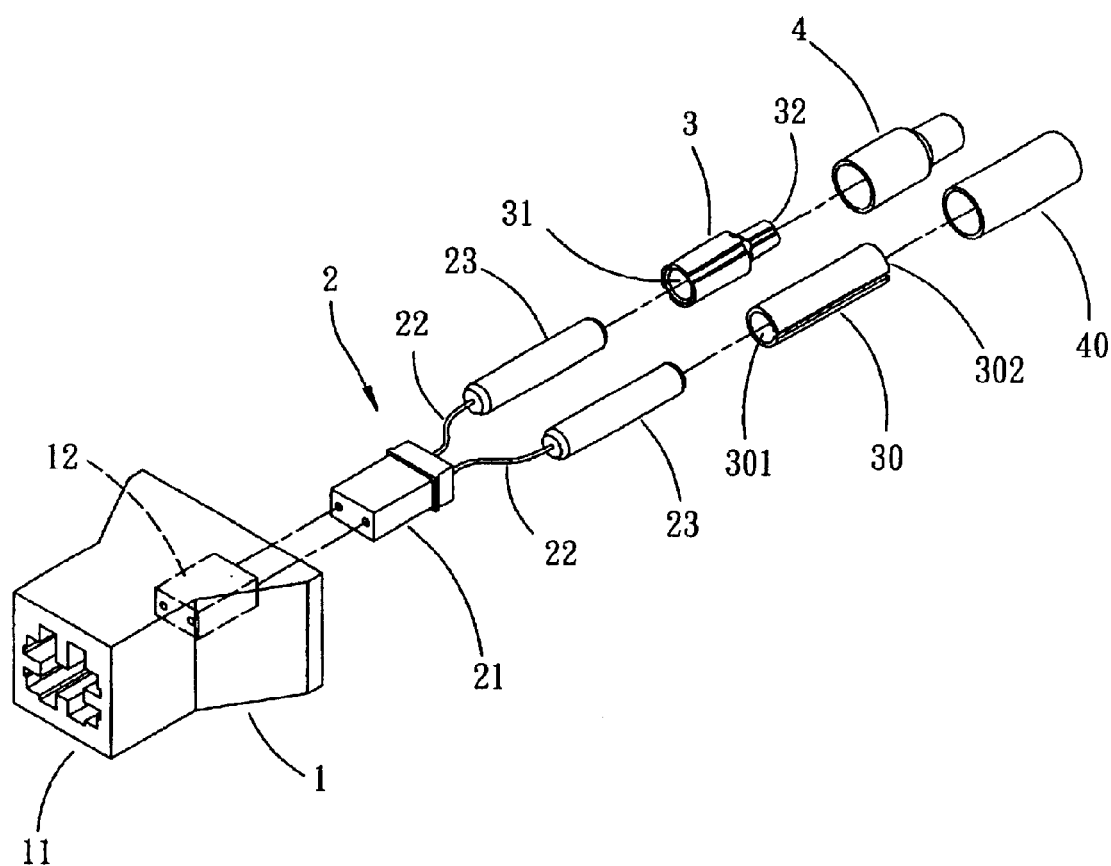
FIG. 2 is an exploded perspective view of the adapter as shown in FIG. 1.

Referring to the drawings and initially to FIGS. 1 and 2, an adapter in accordance with the preferred embodiment of the present invention comprises an insertion terminal 1, a connecting member 2, a plurality of (preferably two) connecting tubes 3 and 30 of different sizes, and a plurality of (preferably two) optical fiber cables 5 and 50.

The insertion terminal 1 has a first side formed with an insertion end 11 for combination with a testing instrument (not shown) and a second side formed with a receiving space 12 connecting to the insertion end 11.

The connecting member 2 is mounted on the insertion terminal 1 and includes a quick connector 21 inserted into the receiving space 12 of the insertion terminal 1, and a plurality of (preferably two) insertion posts 23 each protruded outward from the receiving space 12 of the insertion terminal 1 and each having a first end connected to a distal end of the quick connector 21.

The connecting member 2 further includes a plurality of (preferably two) connecting portions 22 each protruded outward from the receiving space 12 of the insertion terminal 1 and each having a first end connected to the distal end of the quick connector 21 and a second end connected to the first end of a respective one of the insertion posts 23. Preferably, each of the insertion posts 23 of the connecting member 2 has a cylindrical shape.

Each of the connecting tubes 3 and 30 has a first end mounted on a second end of a respective one of the insertion posts 23 of the connecting member 2. Preferably, each of the connecting tubes 3 and 30 is co-axial with a respective one of the insertion posts 23 of the connecting member 2.

Each of the optical fiber cables 5 and 50 has an end mounted on a second end of a respective one of the connecting tubes 3 and 30, and contacting with the second end of a respective one of the insertion posts 23 of the connecting member 2. Preferably, each of the optical fiber cables 5 and 50 is co-axial with a respective one of the insertion posts 23 of the connecting member 2.

Preferably, the first end of each of the connecting tubes 3 and 30 is formed with a first insertion hole 31 and 301 for insertion of the second end of a respective one of the insertion posts 23 of the connecting member 2, and the second end of each of the connecting tubes 3 and 30 is formed with a second insertion hole 32 and 302 for insertion of a respective one of the optical fiber cables 5 and 50.

Preferably, the first insertion hole 31 and 301 of each of the connecting tubes 3 and 30 is co-axial with the second insertion hole 32 and 302. In addition, the first insertion hole 31 of the connecting tube 3 has a diameter different from that of the second insertion hole 32, and the first insertion hole 301 of the connecting tube 30 has a diameter the same as that of the second insertion hole 302.

The adapter further comprises a plurality of (preferably two) protective jackets 4 and 40 each mounted on an outer wall of a respective one of the connecting tubes 3 and 30 to protect and prevent the connecting tubes 3 and 30 from being interrupted.

When in use, the insertion end 11 of the insertion terminal 1 is inserted into the socket (not shown) of the testing instrument, and the quick connector 21 of the connecting member 2 is inserted into the receiving space 12 of the insertion terminal 1. Then, each of the optical fiber cables 5 and 50 is inserted into the second insertion hole 32 and 302 of a respective one of the connecting tubes 3 and 30 to contact with the second end of a respective one of the insertion posts 23 of the connecting member 2 in a co-axial manner.

Accordingly, by connection of the quick connector 21 and the insertion posts 23 of the connecting member 2, each of the optical fiber cables 5 and 50 is connected to the testing instrument stably and efficiently, thereby facilitating the testing instrument performing the relevant testing procedures. In addition, each of the optical fiber cables 5 and 50 can be mounted on and removed from the second insertion hole 32 and 302 of a respective one of the connecting tubes 3 and 30 easily and rapidly for facilitating replacement, thereby greatly shortening the testing time, and thereby enhancing the testing efficiency.

Figure 3:
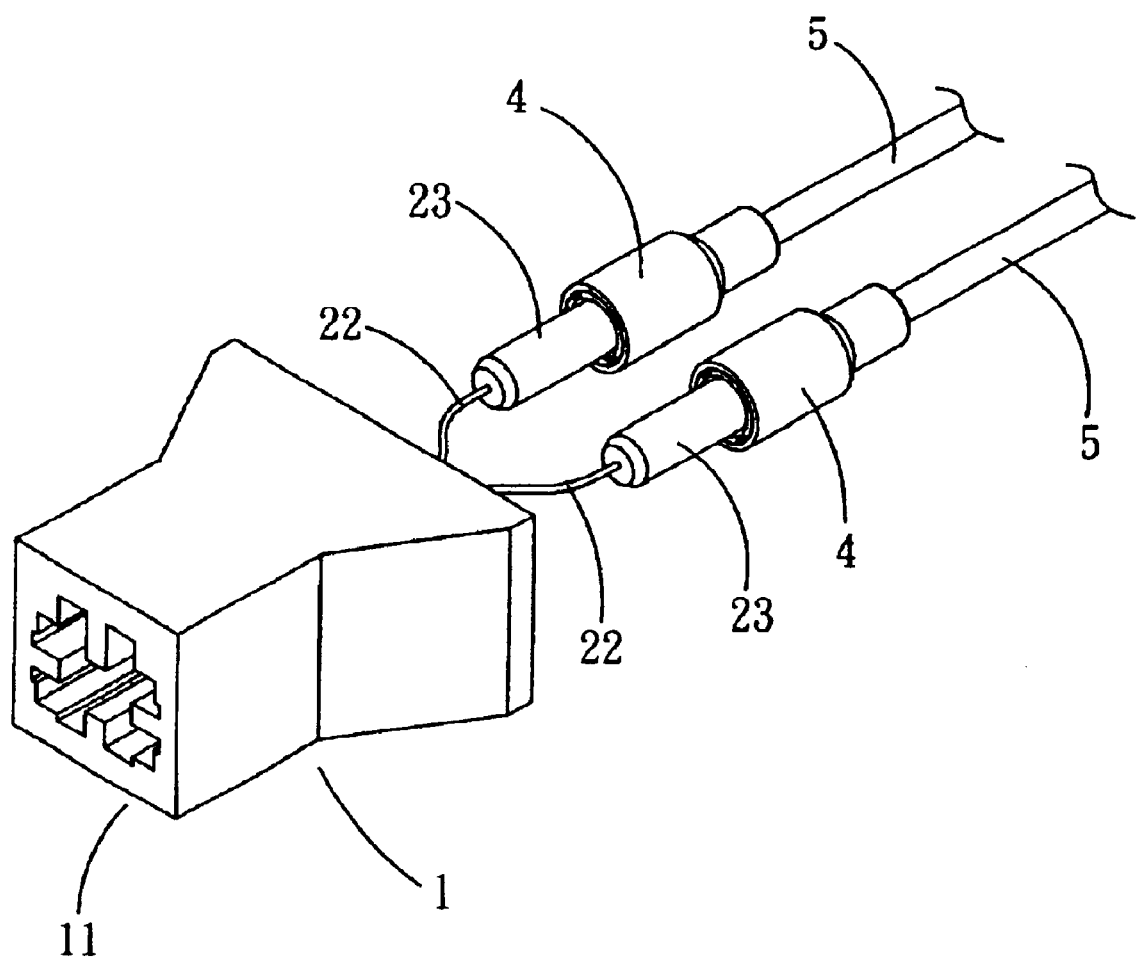
FIG. 3 is a partially cut-away perspective view of an adapter in accordance with another embodiment of the present invention.
Figure 4:
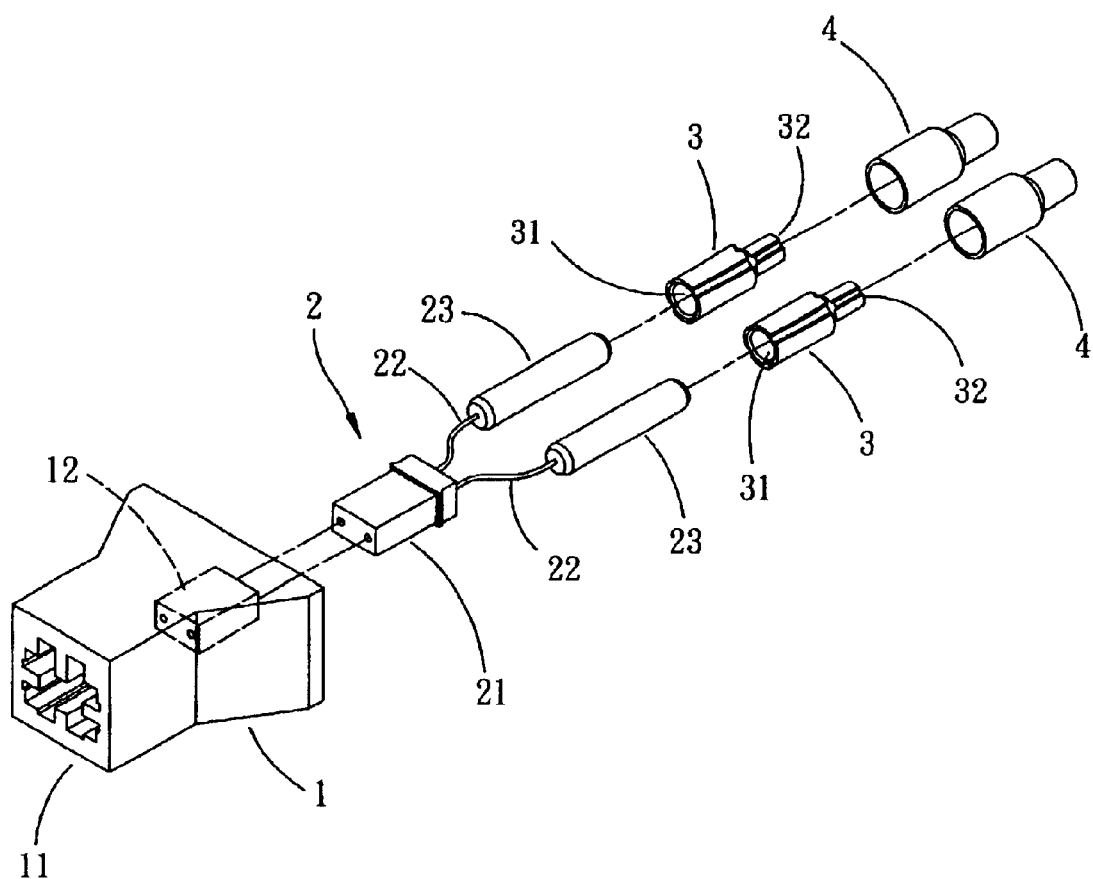
FIG. 4 is an exploded perspective view of the adapter as shown in FIG. 3.

Referring to FIGS. 3 and 4, the adapter in accordance with another embodiment of the present invention comprises two connecting tubes 3 of the same size.

Figure 5:
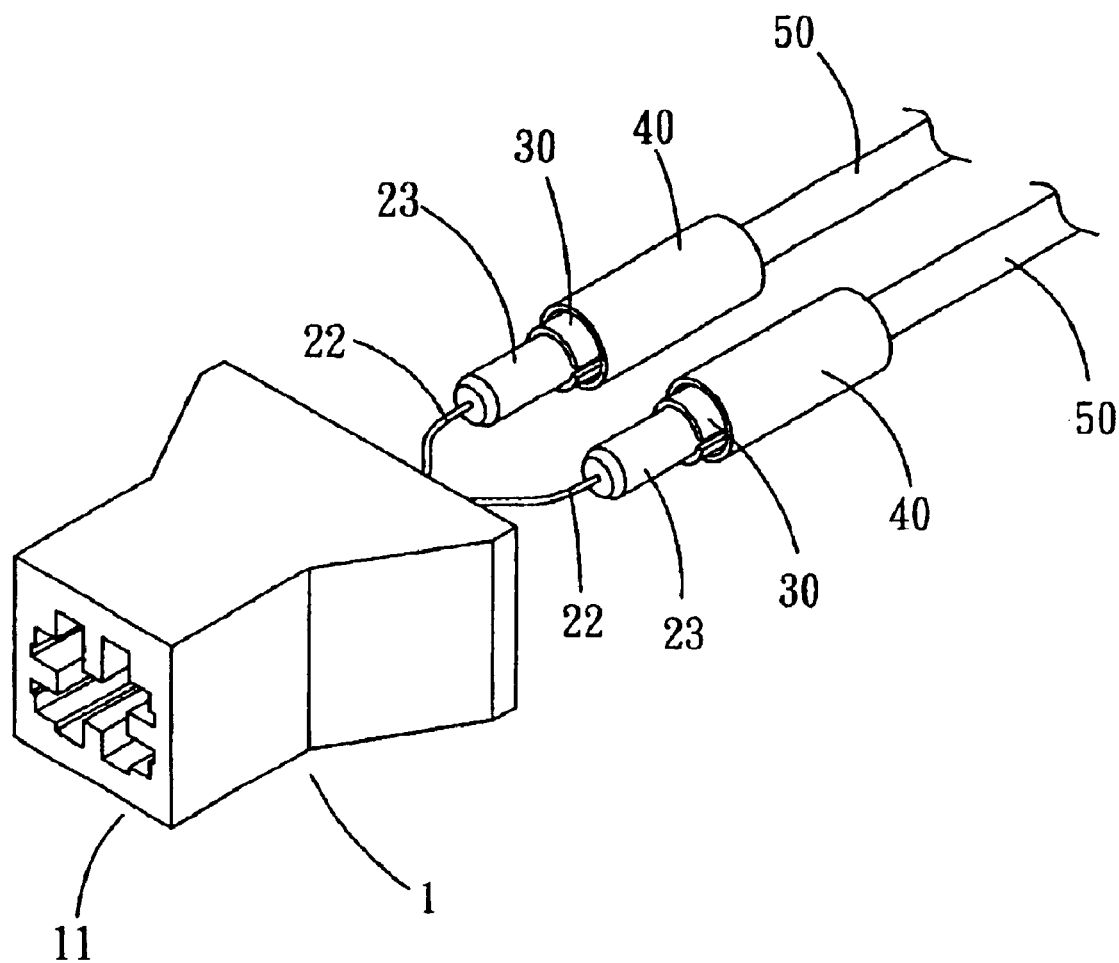
FIG. 5 is a partially cut-away perspective view of an adapter in accordance with another embodiment of the present invention.
Figure 6:
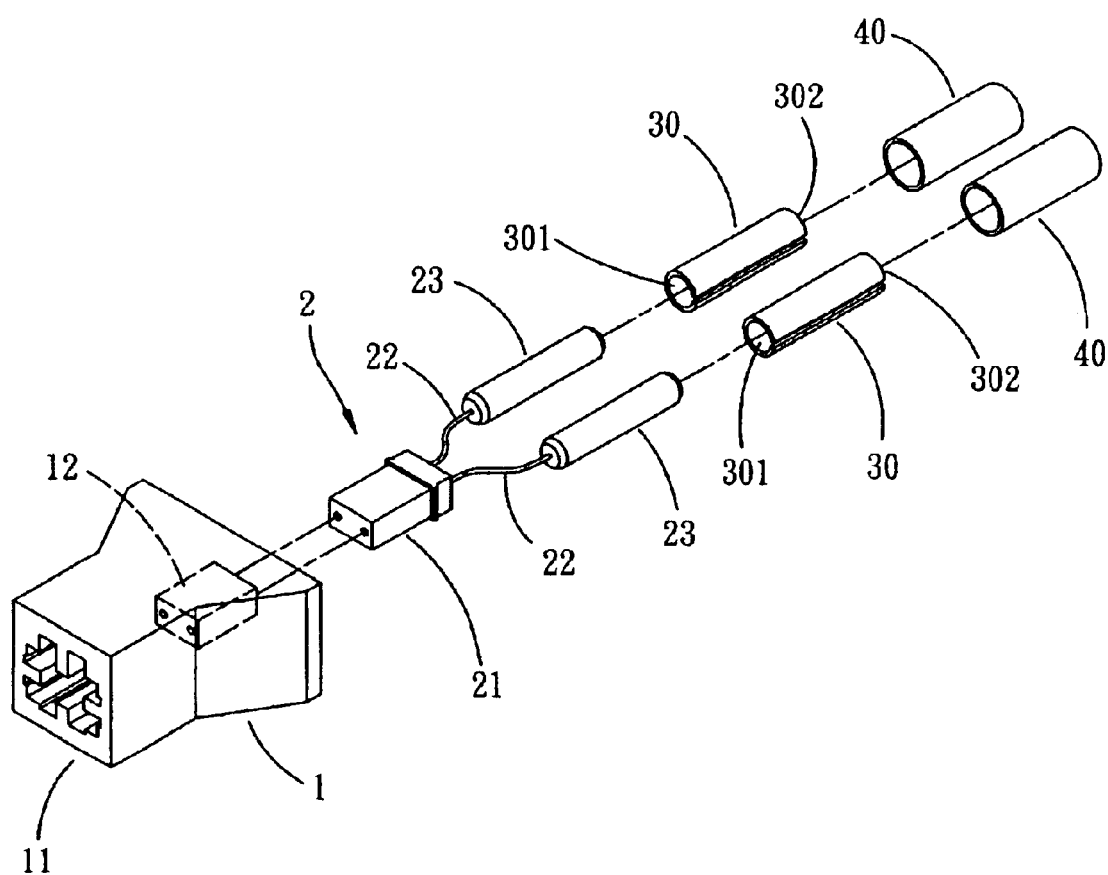
FIG. 6 is an exploded perspective view of the connector adapter as shown in FIG. 5.

Referring to FIGS. 5 and 6, the adapter in accordance with another embodiment of the present invention comprises two connecting tubes 30 of the same size.

Figure 7:
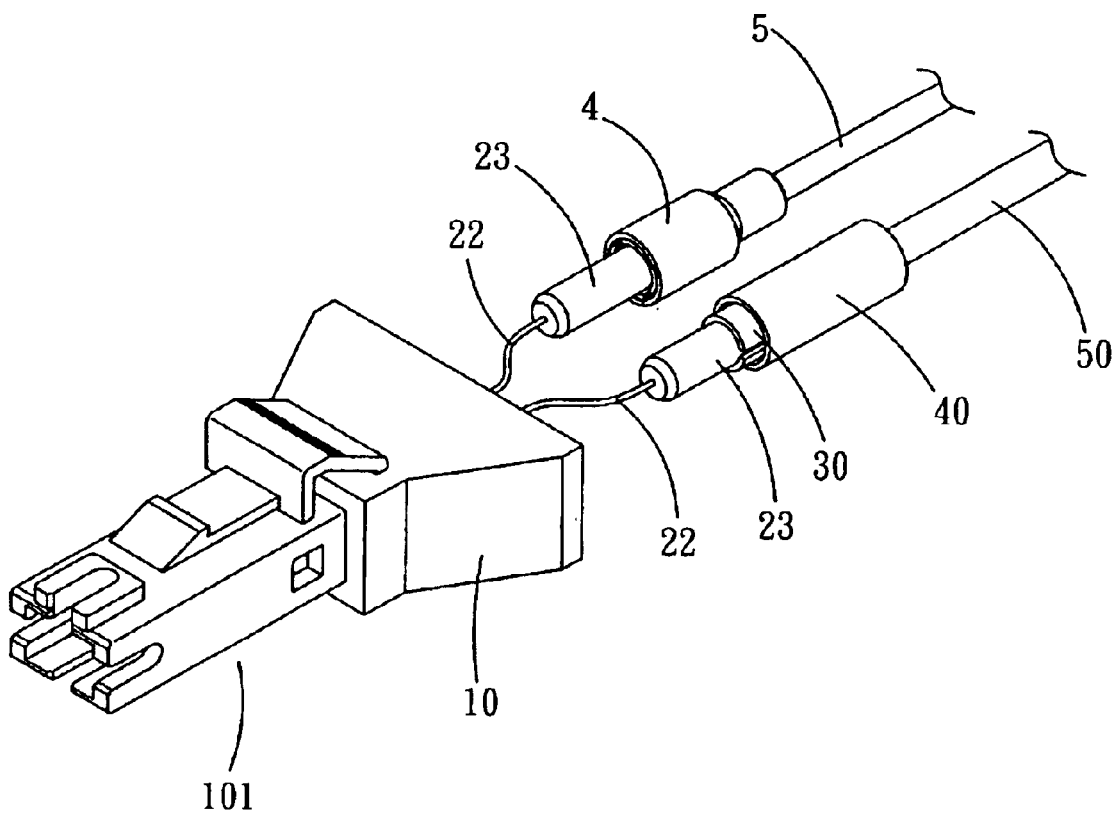
FIG. 7 is a partially cut-away perspective view of a connector an adapter in accordance with another embodiment of the present invention.
Figure 8:
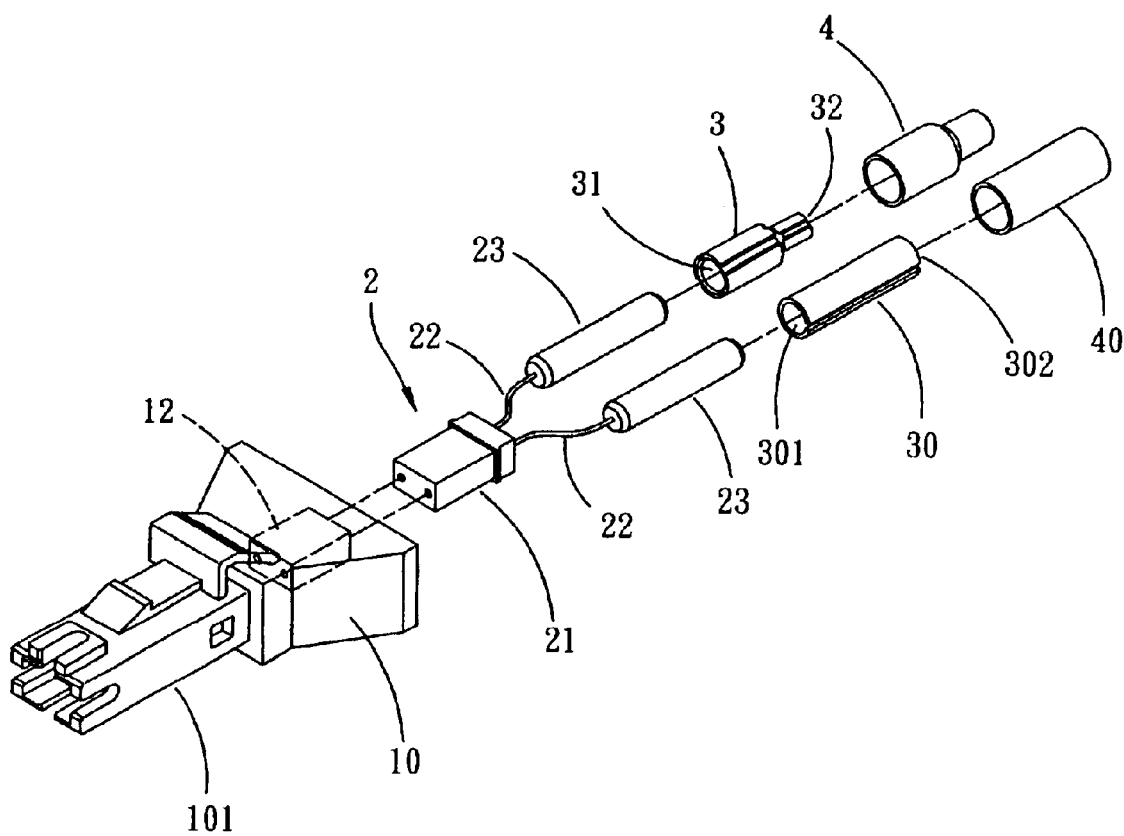
FIG. 8 is an exploded perspective view of the adapter as shown in FIG. 7.

Referring to FIGS. 7 and 8, the adapter in accordance with another embodiment of the present invention comprises two connecting tubes 3 and 30 of different sizes, and the insertion terminal 10 has a first side formed with an insertion end 101 for combination with a testing instrument (not shown) and a second side formed with a receiving space 12.

Figure 9:
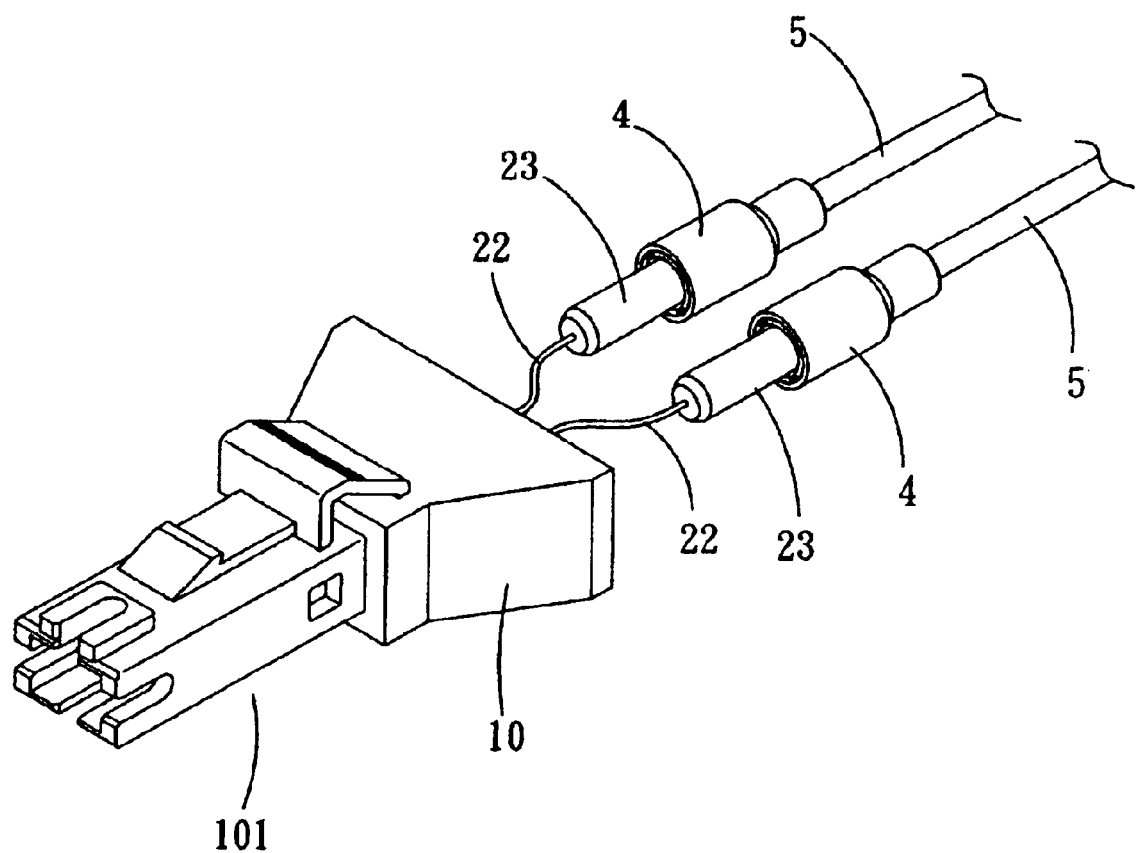
FIG. 9 is a partially cut-away perspective view of a connector an adapter in accordance with another embodiment of the present invention.
Figure 10:
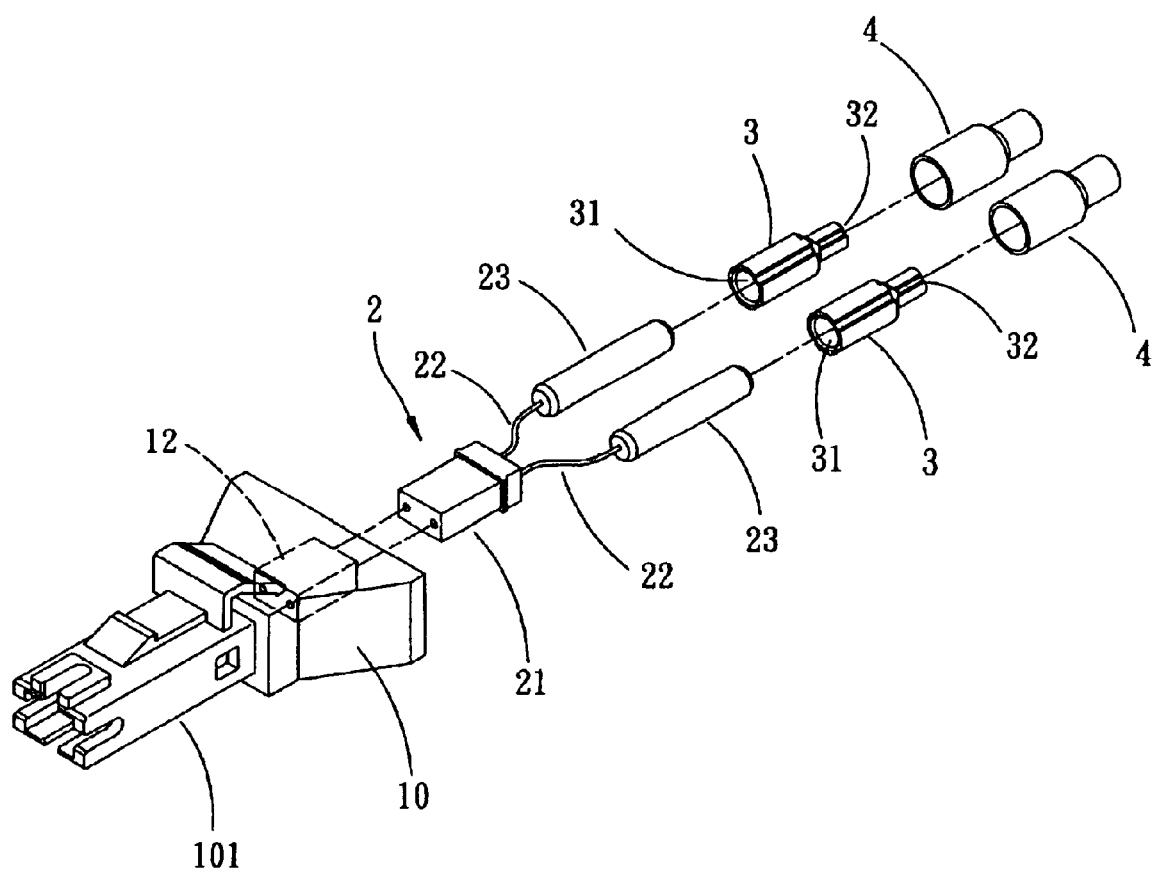
FIG. 10 is an exploded perspective view of the adapter as shown in FIG. 9.

Referring to FIGS. 9 and 10, the adapter in accordance with another embodiment of the present invention comprises two connecting tubes 3 of the same size, and the insertion terminal 10 has a first side formed with an insertion end 101 for combination with a testing instrument (not shown) and a second side formed with a receiving space 12.

Figure 11:
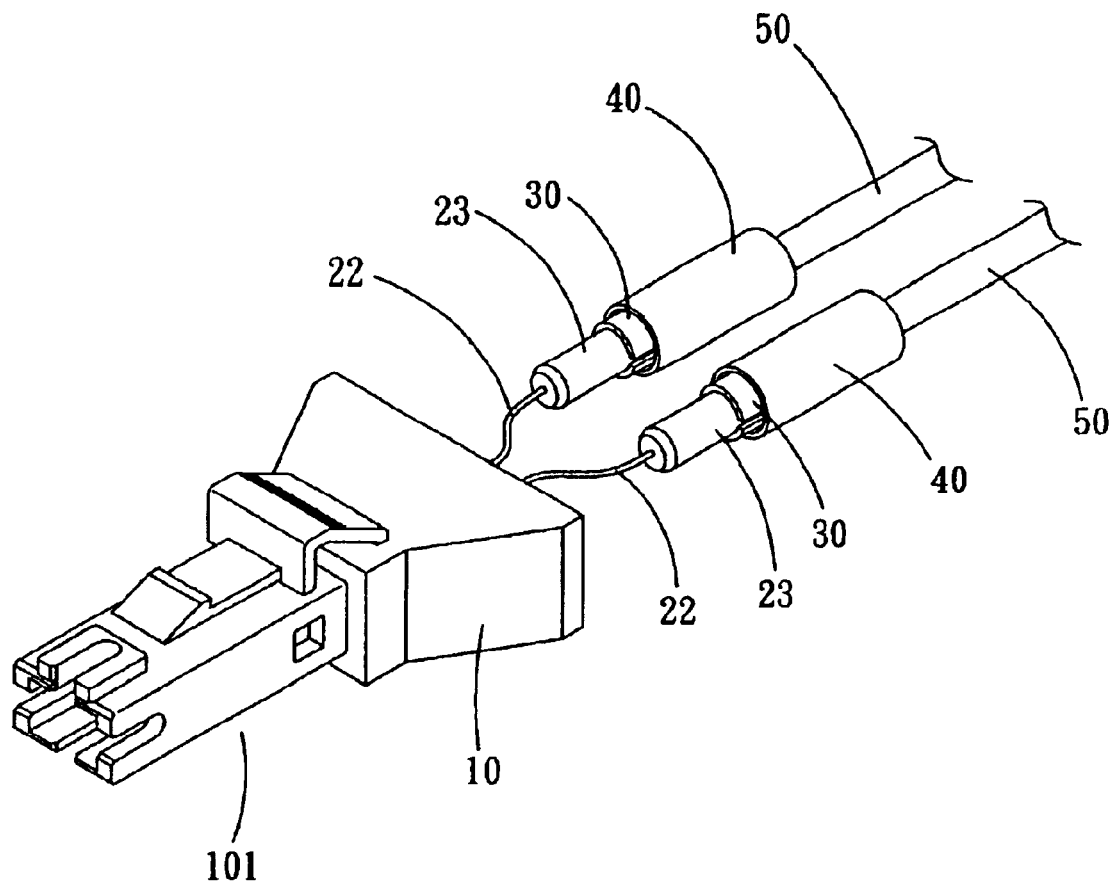
FIG. 11 is a partially cut-away perspective view of a connector an adapter in accordance with another embodiment of the present invention.
Figure 12:
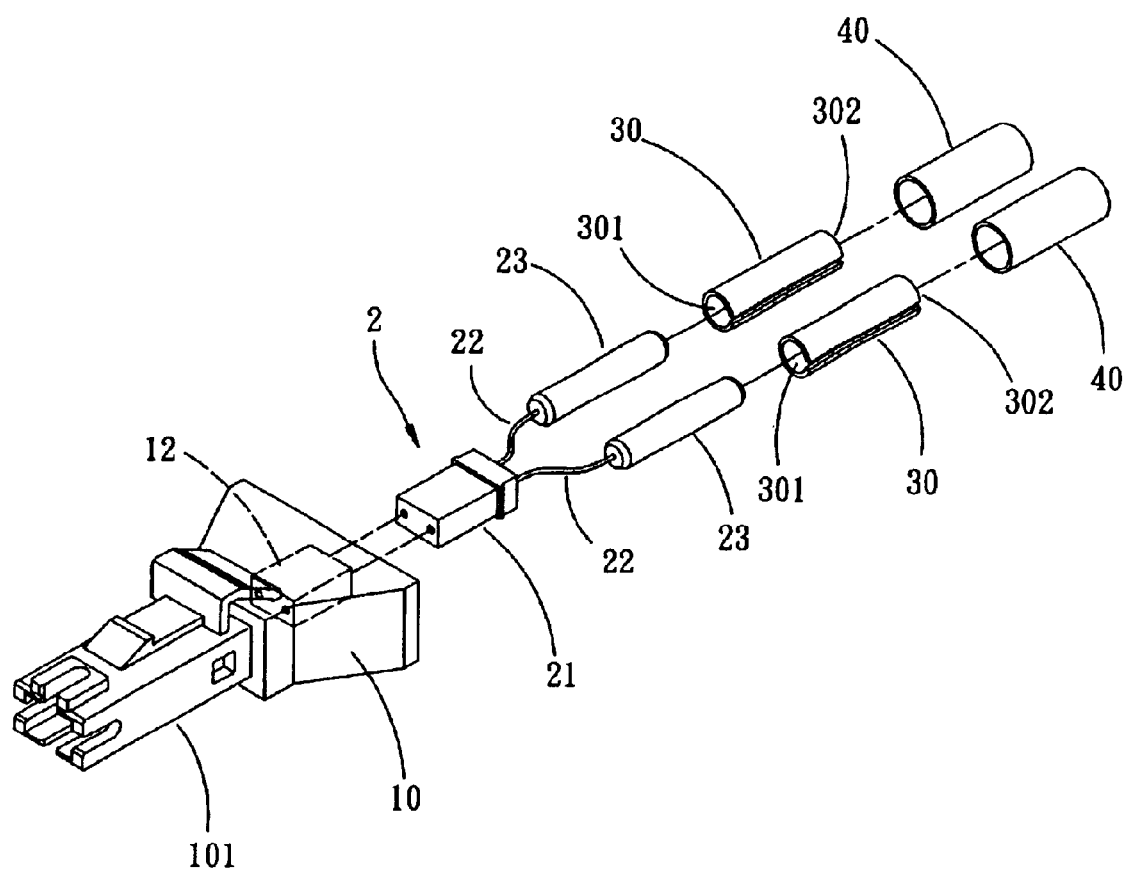
FIG. 12 is an exploded perspective view of the adapter as shown in FIG. 11.
Figure 13:
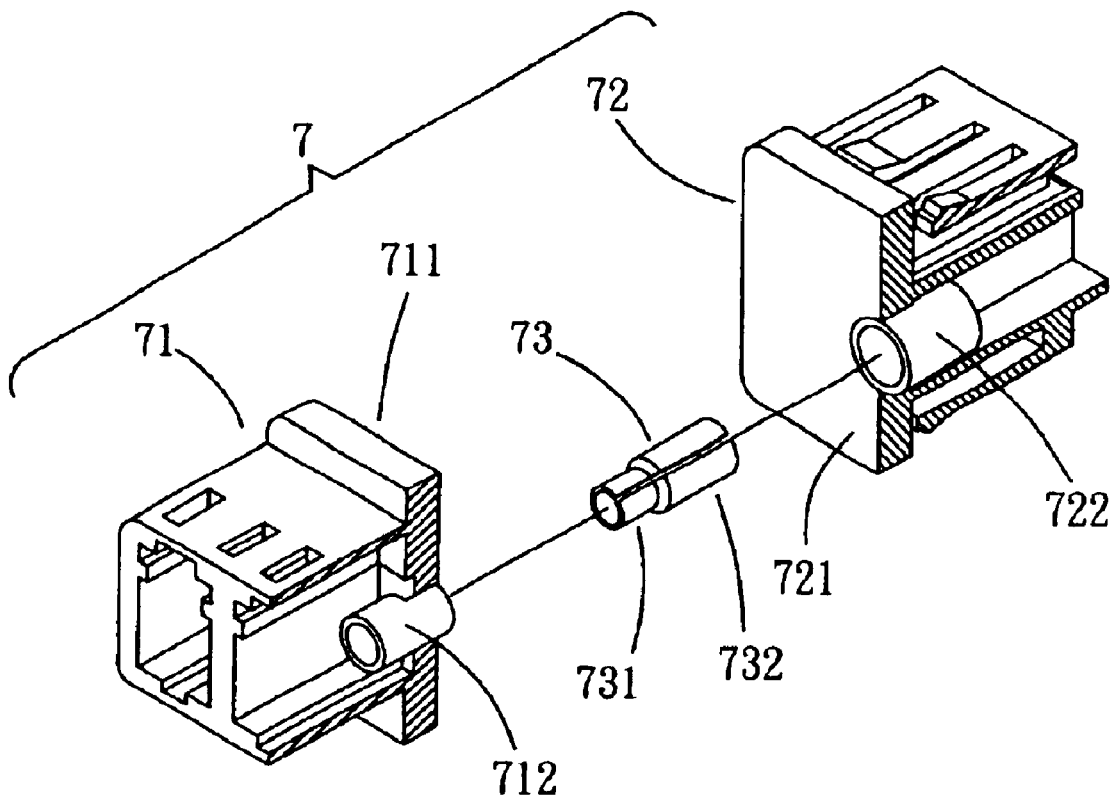
FIG. 13 is an exploded perspective view of a conventional adapter in accordance with the prior art.
Figure 14:
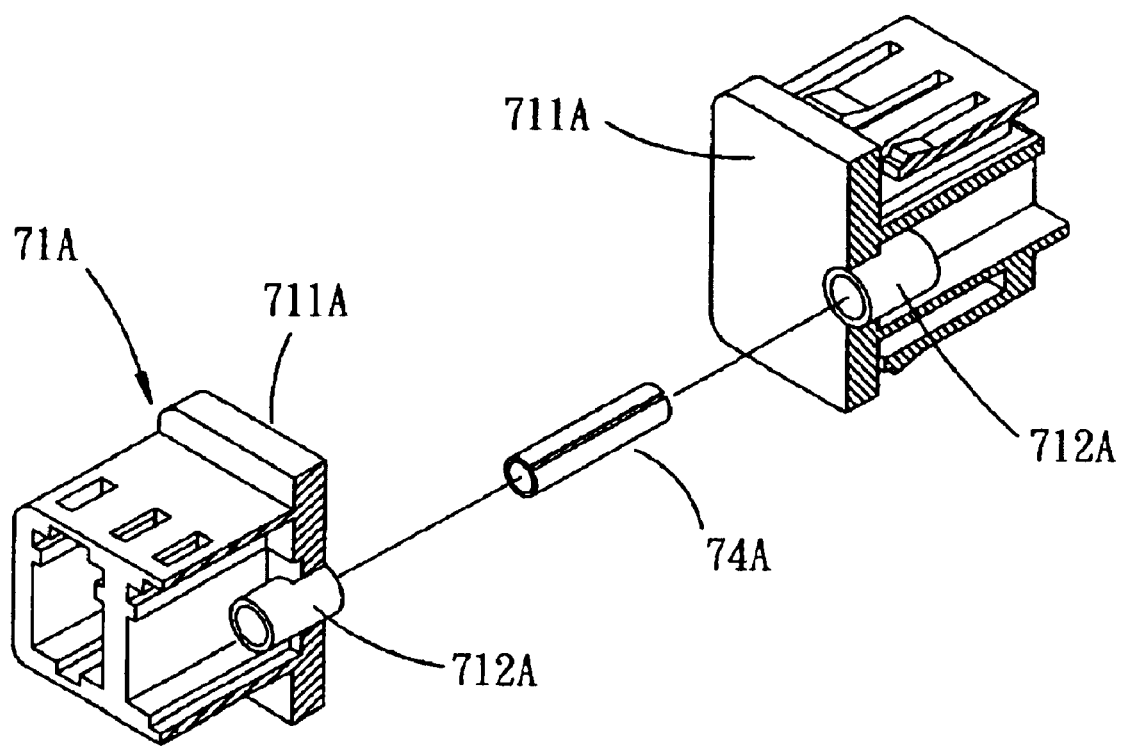
FIG. 14 is an exploded perspective view of another conventional adapter in accordance with the prior art.
Figure 15:
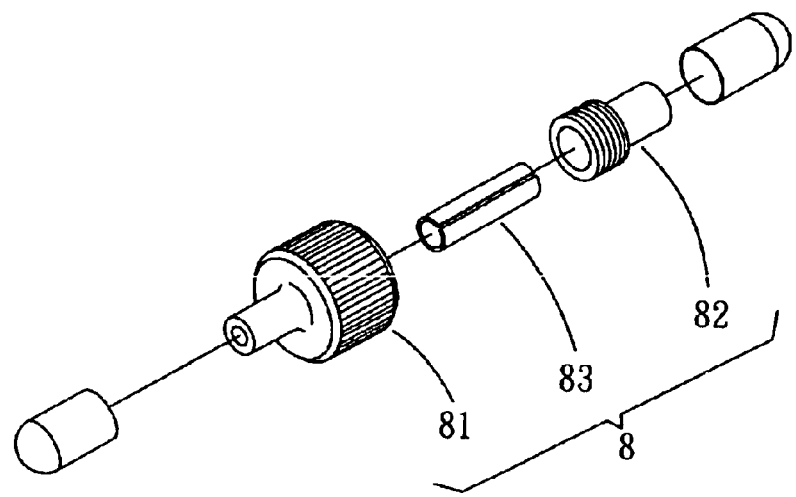
FIG. 15 is an exploded perspective view of another conventional connector adapter in accordance with the prior art.
Figure 16:
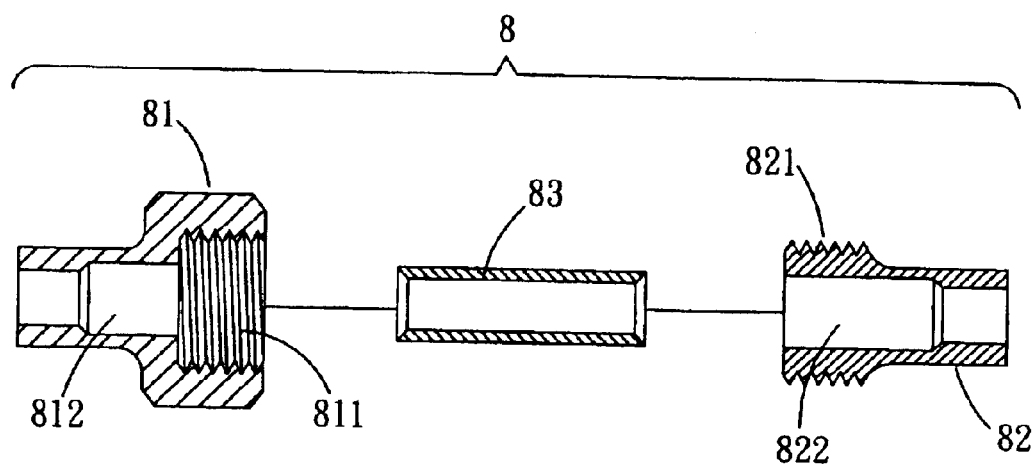
FIG. 16 is a plan exploded cross-sectional view of the conventional adapter as shown in FIG. 15.
Figure 17:
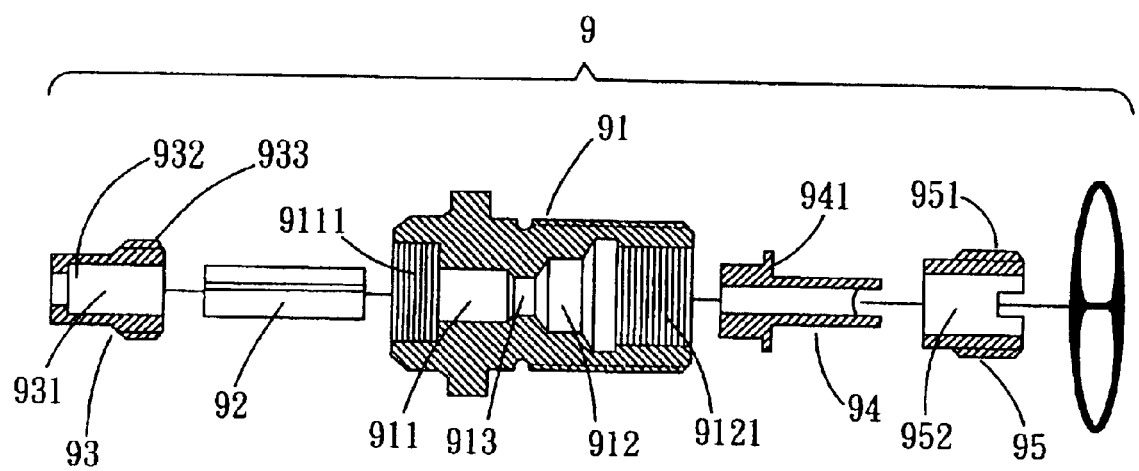
FIG. 17 is a plan exploded cross-sectional view of another conventional adapter in accordance with the prior art.

Referring to FIGS. 11 and 12, the adapter in accordance with another embodiment of the present invention comprises two connecting tubes 30 of the same size, and the insertion terminal 10 has a first side formed with an insertion end 101 for combination with a testing instrument (not shown) and a second side formed with a receiving space 12.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An adapter, comprising:
    an insertion terminal having a first side formed with an insertion end and a second side formed with a receiving space connecting to the insertion end;
    a connecting member mounted on the insertion terminal and including a quick connector inserted into the receiving space of the insertion terminal, and a plurality of insertion posts each having a first end connected to a distal end of the quick connector,
    a plurality of connecting tubes each having a first end mounted on a second end of a respective one of the insertion posts of the connecting member; and
    a plurality of optical fiber cables each having an end mounted on a second end of a respective one of the connecting tubes and each contacting with the second end of a respective one of the insertion posts of the connecting member;
    wherein the first end of each of the connecting tubes is formed with a first insertion hole closely fitted onto the second end of a respective one of the insertion posts of the connecting member, and the second end of each of the connecting tubes is formed with a second insertion hole closely fitted onto a respective one of the optical fiber cables.

2. The adapter in accordance with claim 1, wherein each of the optical fiber cables is co-axial with a respective one of the insertion posts of the connecting member.

3. The adapter in accordance with claim 1, wherein the first insertion hole of each of the connecting tubes is co-axial with the second insertion hole.

4. The adapter in accordance with claim 1, wherein each of the insertion posts of the connecting member is protruded outward and spaced away from the receiving space of the insertion terminal.

5. The adapter in accordance with claim 1, wherein each of the insertion posts of the connecting member has a cylindrical shape.

6. The adapter in accordance with claim 1, wherein the connecting member further includes a plurality of connecting portions each having a first end connected to the distal end of the quick connector and a second end connected to the first end of a respective one of the insertion posts.

7. The adapter in accordance with claim 6, wherein each of the connecting portions of the connecting member is protruded outward and spaced away from the retrieving space of the insertion terminal.

8. The adapter in accordance with claim 1, further comprising a plurality of protective jackets each mounted on an outer wall of a respective one of the connecting tubes.

9. The adapter in accordance with claim 6, wherein each of the connecting tubes is co-axial with a respective one of the insertion posts of the connecting member.

* * * * *